United States Patent
Chang et al.

(10) Patent No.: US 6,272,315 B1
(45) Date of Patent: Aug. 7, 2001

(54) MOBILE SATELLITE SYSTEM/ TERRESTRIAL WIRELESS SYSTEM INTERWORKING TECHNIQUES

(75) Inventors: Jue Chang; Wing F. Lo; Won S. Kim, all of Plano, TX (US)

(73) Assignee: Northern Telecom Limited, Montreal (CA)

( * ) Notice: Subject to any disclaimer, the term of this patent is extended or adjusted under 35 U.S.C. 154(b) by 0 days.

(21) Appl. No.: 09/061,420

(22) Filed: Apr. 16, 1998

Related U.S. Application Data

(60) Provisional application No. 60/067,744, filed on Dec. 3, 1997.

(51) Int. Cl.[7] .............................. H04B 7/185; H04B 7/19; H04Q 7/20; G01S 7/19; H04J 11/00
(52) U.S. Cl. .................... 455/13.1; 455/13.2; 455/428; 455/435; 455/433; 455/453; 342/357.1; 342/357.16; 370/203; 370/209; 370/316
(58) Field of Search ..................... 342/357.6, 357.1; 370/209, 203, 316; 455/433, 13.2, 13.1, 428, 435, 453

(56) References Cited

U.S. PATENT DOCUMENTS

| | | | |
|---|---|---|---|
| 5,528,247 | * | 6/1996 | Nanami ........................... 342/357.1 |
| 5,537,610 | | 7/1996 | Mauger et al. . |
| 5,543,813 | * | 8/1996 | Araki et al. ..................... 342/357.16 |
| 5,602,833 | * | 2/1997 | Zehavi ............................... 370/209 |
| 5,691,974 | * | 11/1997 | Zehavi et al. ...................... 370/203 |
| 5,710,805 | * | 1/1998 | Armbruster et al. ............... 455/433 |
| 5,732,359 | | 3/1998 | Baranowsky, II et al. . |
| 5,732,387 | * | 3/1998 | Armbruster et al. .............. 455/13.2 |
| 5,867,765 | * | 2/1999 | Nilsson ............................. 455/13.1 |
| 5,890,062 | * | 3/1999 | Courtney et al. ................... 455/428 |
| 5,907,541 | * | 5/1999 | Fairholm et al. ................... 370/316 |
| 5,937,352 | * | 8/1999 | Courtney et al. ................... 455/435 |
| 5,956,644 | * | 9/1999 | Miller et al. ....................... 455/453 |
| 6,038,446 | * | 3/2000 | Courtney et al. ................... 455/428 |

FOREIGN PATENT DOCUMENTS

| | | |
|---|---|---|
| 0762669 A2 | 3/1997 | (EP) . |
| WO 96/14719 | 5/1996 | (WO) . |

\* cited by examiner

*Primary Examiner*—William Cumming
(74) *Attorney, Agent, or Firm*—Haynes and Boone LLP

(57) ABSTRACT

Methods for switching a mobile between operation in an mobile satellite system mode and a terrestrial wireless mode. When operating in the terrestrial wireless mode, the mobile terminal will initiate an attempt to switch into the MSS mode when it nears the boundary of the coverage area for a terrestrial wireless system to which it is registered. Conversely, a mobile terminal operating in the MSS mode will regularly attempt to switch into the terrestrial wireless mode. For both, a switch between modes is contingent on the mobile terminal identifying a suitable system for registration therewith upon completing the switch between modes. The criteria for identifying a suitable system for selection purposes include the following: (1) the selected system is available, i.e., the mobile terminal is physically located within a coverage area for the selected system; (2) the mobile terminal is compatible with the selected system; and (3) the selected system is willing to accept the mobile terminal. If multiple systems meet these criteria, the mobile terminal will utilize a stored list of preferred systems to select therefrom. When switching into the terrestrial wireless mode, the MSS system provides the mobile terminal with switch-over information for the underlying terrestrial wireless systems and, when switching into the MSS mode, the terrestrial wireless system provides the mobile terminal with switch-over information for the overlying MSS systems.

16 Claims, 5 Drawing Sheets

MOBILE SATELLITE SYSTEM/ TERRESTRIAL WIRELESS SYSTEM INTERWORKING TECHNIQUES

CROSS-REFERENCE TO RELATED APPLICATIONS

This application claims the benefit of the filing date of U.S. provisional patent application Ser. No. 60/067,744 filed on Dec. 3, 1997.

TECHNICAL FIELD

The invention relates generally to mobile satellite and terrestrial wireless communication systems call and, more particularly, to interworking techniques for enabling a dual-mode mobile satellite/terrestrial wireless phone to transparently switch between satellite and terrestrial wireless service providers.

BACKGROUND OF THE INVENTION

Mobile satellite systems (or "MSSs") are satellite systems which support mobile voice and/or data services. MSSs have a number of advantages over more common terrestrial wireless communication systems such as cellular or personal communication systems (or "PCS"). One such advantage is that MSS systems typically provide larger coverage areas. MSS systems may also be more cost effective in undeveloped and lightly developed rural areas where a terrestrial mobile communication system may be both difficult and costly to install and maintain. For these reasons, MSS systems are often seen as the key to achieving global coverage for mobile communication systems.

MSS systems are not without their shortcomings, however. MSS systems may fail to deliver services when line-of-sight requirements are violated, for example, when service is attempted in urbanized areas populated with numerous high-rise buildings. Service from MSS systems is typically much more costly than service from terrestrial systems. MSS service also lacks many of the user features which have made cellular and PCS systems popular. Thus, from this perspective, cellular or PCS systems are often preferred over MSS systems when both are available.

While MSS and terrestrial wireless systems are often interconnected by way of the public switched telephone network (or "PSTN"), such interconnections have shortcomings. For example, in FIG. 1, an MSS system 10, representatively illustrated by a MSS satellite and a terrestrial wireless system, representatively illustrated by a mobile switching center 12 bi-directionally coupled to a base station 14, provide service coverage throughout geographic areas 16 and 18, respectively. The MSS system 10 is coupled to PSTN 26 by a gateway 28 (a satellite dish physically coupled to the PSTN 26 and in two-way radio communication with the MSS system 10) while the terrestrial wireless system 12 is coupled to the PSTN 26 by a local exchange carrier (or "LEC") 30 bi-directionally coupled to the MSC 12. Also shown in FIG. 1 are first, second and third mobile terminals 20, 22 and 24, all of which are located within the coverage area 16 of the MSS system 10 but only two of which (the mobile terminals 20 and 22) are located within the coverage area 18 of the terrestrial wireless system 12. If one assumes that the first mobile terminal 20 is configured for operation as an MSS system terminal while the second and third mobile terminals 22 and 24 are configured for operation as terrestrial wireless system terminals, a call originated by the first mobile terminal 20 and having the second mobile terminal 22 as its destination is directed from the first mobile terminal 20 to the MSS system 10, the gateway 28, the PSTN 26, the LEC 30, the MSC 12 and the base station 14 before arriving at the second mobile terminal 22. Thus, even though the first and second mobile terminals are in close physical proximity to each other, not only must a call between the two be directed along a circuitous route, but along a route subject to substantial toll charges. Furthermore, as the third mobile terminal 24 is outside the coverage area 18 of the terrestrial wireless system, a call from the first mobile terminal 20 to the third mobile terminal 24 cannot be completed even though the third mobile terminal 24 is within the coverage area 16 for the MSS system 10. Thusly, the existing interconnection between the MSS system 10 and the terrestrial wireless system 12 typically provides limited service at relatively high cost.

In order to ensure the broadest possible geographical coverage and to avoid unnecessarily expensive calls, a wireless subscriber must currently carry both terrestrial wireless and MSS phones. As such a solution is both cumbersome (because of the need to carry two phones and two phone numbers) and expensive (because of the need to contract with two service providers), a dual mode phone capable of operating within both MSS and terrestrial wireless systems with manual mode switching between the two systems has been proposed. However, such a phone lacks the ability to automatically change operating mode when a switch between systems would be advantageous to the user. Manual switching systems also require considerable user knowledge as to when a switch between satellite and terrestrial systems would be advantageous and lack the "seamless" switching preferred by many consumers for multi-mode terminals.

For example, for a mobile terminal to first switch from operation in a terrestrial wireless mode to operation in a MSS mode and to then register with a MSS system, the mobile terminal must overcome certain obstacles. More specifically, before the mobile terminal can initiate the registration process, the mobile terminal must first locate a MSS system, determine its access type and determine synchronization information such as differential and propagation delay factors. Similar obstacles make it difficult for a mobile terminal to switch from the MSS mode into the terrestrial wireless mode and then register with a terrestrial wireless system. While the mobile terminal can search for and acquire all of the information needed to initiate the registration process, the process can be quite time consuming. For example, much of the needed information can be obtained from the control channel for the MSS or terrestrial wireless systems broadcast. However, each system (or cell within a system) broadcasts at a different frequency within an operating band. Thus, to locate a control channel, the mobile terminal must scan the entire operating band. While the mobile terminal is searching for and acquiring information needed to register with a system operating in a different mode, it may be forced to suspend all other operations. Thus, the mobile terminal may lose calls and miss incoming pages, thereby reducing terminal availability and call delivery success rates.

SUMMARY OF THE INVENTION

For a dual mode mobile terminal capable of operating a first mode in which calls are routed through a MSS system and a second mode in which calls are routed through a terrestrial wireless system such as a cellular or PCS system, the present invention is directed to interwork techniques for the dual mode mobile terminal which increase availability of the mobile terminal to receive calls by reducing the time required for the mobile terminal to switch between the first and second modes. Switch-over time is reduced by having the systems which operate in a first mode provide mobile terminals registered thereto with information which will assist the mobile terminals if they attempt to register with a system which operates in a second mode. By doing so, the mobile terminal can more quickly locate and register with a system operating in a different mode and will spend considerably less time unavailable while searching for a new system to register therewith.

The interwork techniques subject of the present invention also encourages the most economical use of such a dual-mode mobile terminal in that, as terrestrial wireless service provides such as cellular or PCS service providers are typically less expensive then calls routed through a MSS service provider, when registered to a MSS system service provider, the mobile terminal will continuously seek out a less expensive terrestrial wireless system service provider.

The interwork technique subject of the present invention also encourage broader continual geographical coverage for a mobile terminal by automatically seeking a suitable MSS service provider whenever the mobile terminal detects that it is leaving the coverage area for a terrestrial wireless system to which it is registered.

Finally, by only executing when the mobile terminal is idle, the interwork techniques which are the subject of the present invention and which provide the aforementioned benefits of reduced cost and broader continual coverage area, are transparent to the user.

In accordance with the teachings of the present invention, when operating in the terrestrial wireless mode, the mobile terminal will initiate an attempt to switch into the MSS mode when it nears the boundary of the coverage area for a terrestrial wireless system to which it is registered. Conversely, a mobile terminal operating in the MSS mode will regularly attempt to switch into the terrestrial wireless mode. For both, a switch between modes is contingent on the mobile terminal identifying a suitable system for registration therewith upon completing the switch between modes. The criteria for identifying a suitable system for selection purposes include the following: (1) the selected system is available, i.e., the mobile terminal is physically located within a coverage area for the selected system; (2) the mobile terminal is compatible with the selected system; and (3) the selected system is willing to accept the mobile terminal. If multiple systems meet these criteria, the mobile terminal will utilize a stored list of preferred systems to select therefrom. When switching into the terrestrial wireless mode, the MSS system provides the mobile terminal with switch-over information for the underlying terrestrial wireless systems and, when switching into the MSS mode, the terrestrial wireless system provides the mobile terminal with switch-over information for the overlying MSS systems.

DESCRIPTION OF PREFERRED EMBODIMENT

Figure 1:
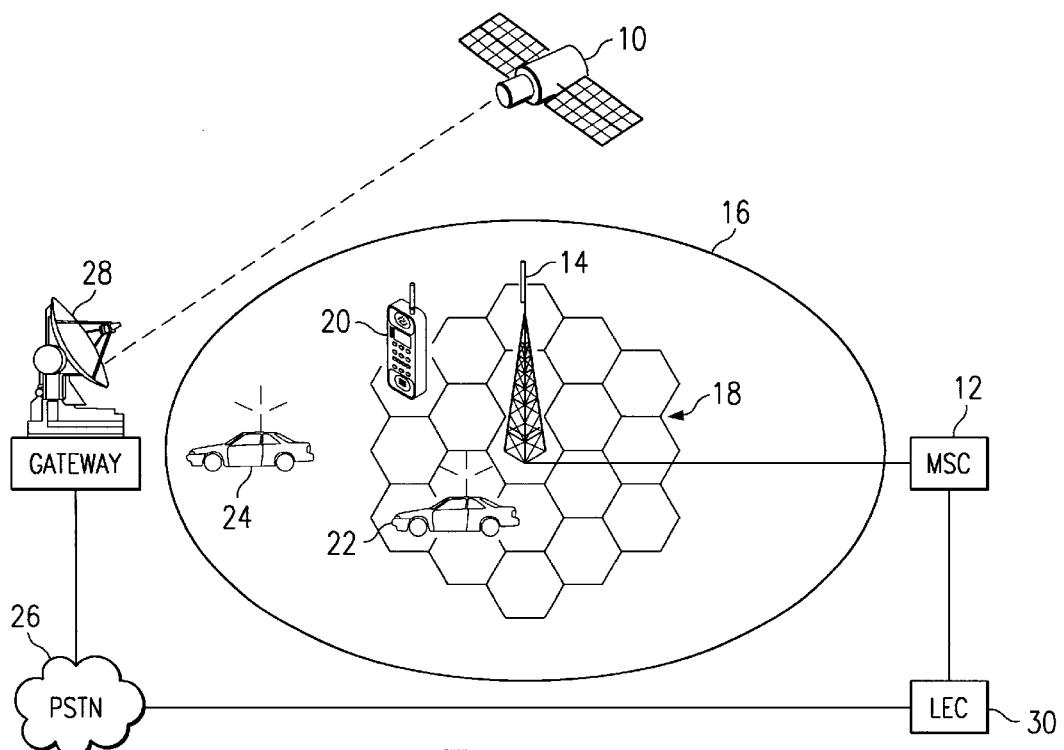
FIG. 1 is a block diagram of MSS and terrestrial wireless communication systems having overlapping coverage areas.

Referring now to FIG. 1, it is now presumed that the first mobile terminal 20 is a dual-mode mobile terminal configured for operation in a first mode wherein the mobile terminal 20 is capable of establishing voice or data connections with a second terminal via the MSS system 10 and in a second mode whereby the mobile terminal 20 is capable of establishing voice or data connections via the terrestrial wireless system 12 which, in alternate embodiments thereof, may be a cellular or PCS system. Preferably, the mobile terminal 20 will include a selector switch which enables user selection of operation in either one of MSS mode or in terrestrial wireless mode. In the absence of such a selector switch, the mobile terminal should be configured to default to operation in one of the two modes, for example, MSS mode. It is also preferred that the mobile terminal 20 include a processor subsystem (not shown) which, upon power-up of the mobile, initially switches the mobile terminal 20 into the selected mode, registers the mobile terminal 20 with an available system and then launches an application which monitors operation of the mobile terminal 20 and determines when switches between operation in MSS mode and operation in terrestrial wireless mode are appropriate. It is still further preferred that the mobile terminal 20 also include a memory subsystem (also not shown) which contains, among other items, a list of all known systems which the mobile terminal 20 has a "roaming" or other type of service agreement, a list of the MSS systems, arranged in order of preference for use and a list of terrestrial wireless systems, again arranged in order of preference for use. As will be more fully described below, the list of known systems shall be a dynamic list subject to periodic modification, for example, by adding additional MSS and/or terrestrial wireless systems to the lists of known systems.

Figure 2:
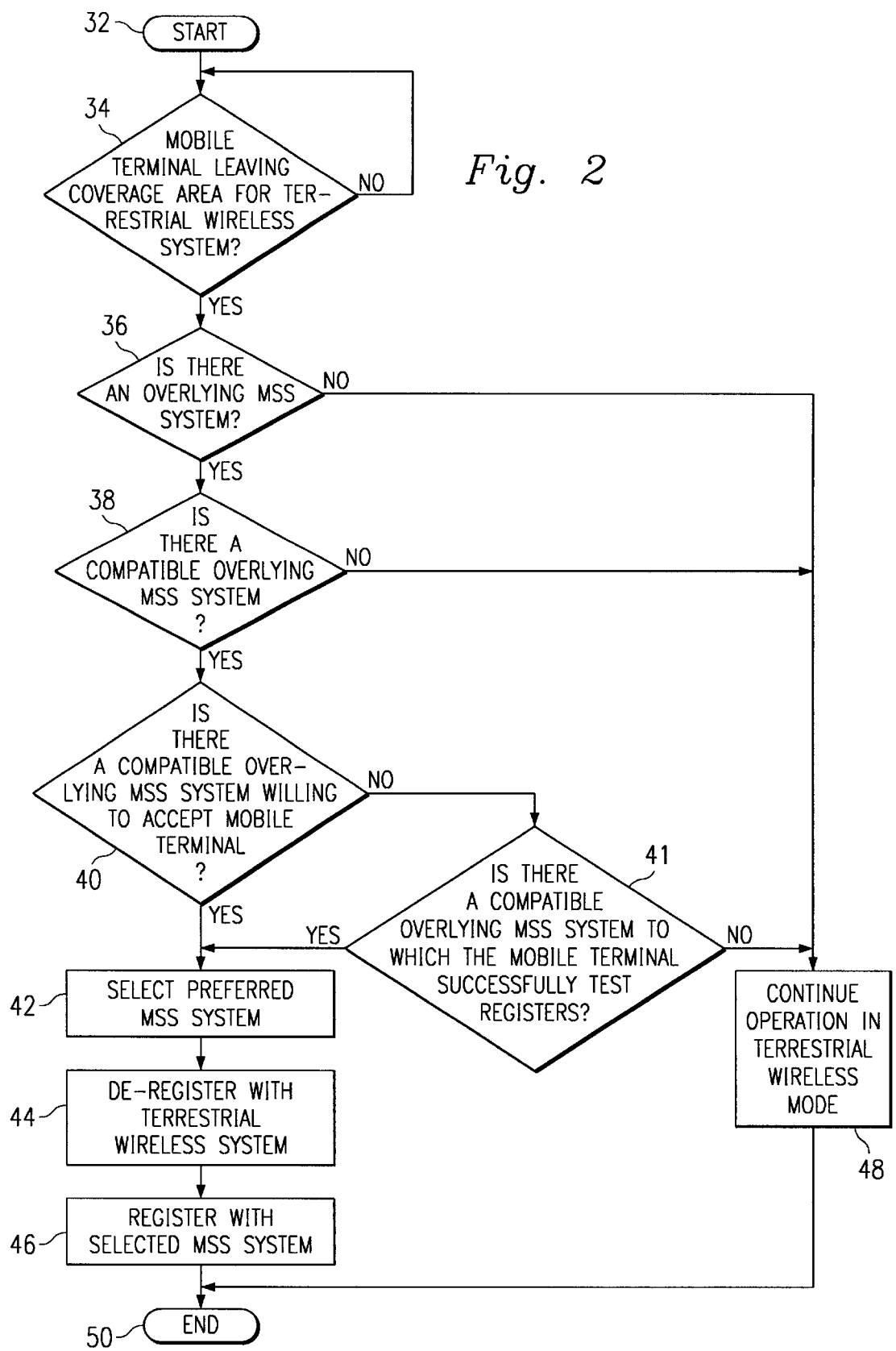
FIG. 2 is a flow chart of a method for switching a dual mode mobile terminal from a first, terrestrial wireless, mode into a second, MSS, mode.

Referring next to FIG. 2, a method of automatically switching the mobile terminal 20 from a terrestrial wireless system to which it had previously been registered to a MSS system when the mobile terminal 20 travels outside of the coverage area 18 of the terrestrial wireless system will now be described in greater detail. A switch from registration with a terrestrial wireless system to an MSS system is herein defined as an "idle hand-up." The method starts at step 32 when the following preconditions have been met: the mobile terminal 20 is powered-up, is registered with a terrestrial wireless system and is idle. If any of these preconditions are not present, the method will not commence. For example, if the mobile terminal 20 is in use, it will not begin the process by which a switch into MSS mode is accomplished. In this regard, it should be clearly understood that the present invention does not support in-call mode switches.

Upon commencement thereof, the method proceeds to step 34 where the mobile terminal 20 determines if it is leaving the coverage area 18 for the terrestrial wireless system 12 to which it is registered. It is contemplated that various techniques may be used to determine if the mobile terminal 20 is leaving the coverage area 18. Accordingly, it should be clearly understood that the particular technique described herein is purely exemplary. While idle, it is the responsibility of the mobile terminal 20 to periodically check the signal strength of the control channel of the terrestrial wireless system to which the mobile terminal 20 has been registered. As the time period between successive checks is very short, the mobile terminal 20 is, in effect, continuously checking signal strength of the control channel. If a check of the signal strength of the control channel of the terrestrial wireless system indicates that the signal strength has sufficiently weakened, for example, by dropping below a preselected threshold value, the mobile terminal 20 will then check signal strength of the control channel for neighboring cells. If the mobile terminal 20 determines that the signal strength for the control channel for one of the neighboring cells is stronger, a registration and location update will be conducted and, once this procedure is completed, the mobile terminal 20 will begin monitoring the control channel of the neighboring cell. If the control channel for none of the neighboring cells have a greater signal strength, the mobile terminal 20 determines that it will soon drop out of the coverage area 18 for the terrestrial wireless system and will begin the process of identifying an MSS system to register therewith.

Upon determining that it is leaving the coverage area 18, the method proceeds to step 36 where the mobile terminal 20 begins a review of data regarding the available MSS systems. For the mobile terminal 20 to switch into MSS mode and conduct operations with an, as yet unselected, MSS system, it is contemplated that the following data will be needed: a list of all of the MSS systems which overlie the terrestrial wireless system 12 and, for each such overlying MSS system, "switch-over" information, i.e., the information needed for the mobile terminal 20 to conduct operations, for the MSS system. It is contemplated that the switch-over information for an MSS system should include the following: satellite network ID, satellite network type, control channel structure, synchronization timing offset information, satellite orbit parameters and RF bands and radio parameters. The satellite network ID uniquely identifies an MSS system. The satellite network type identifies the access method to which the MSS system adheres. For example, TDMA and CDMA represent different access methods to which the MSS system may adhere. The control channel structure identifies the frequency and channel number for the control channel for the MSS system. Synchronization timing offset information includes dynamic satellite information such as differential delay and propagation delay due to distance and satellite movement. Satellite orbit parameters provides locational information for the MSS system and is particularly useful for mobile terminals having directional antennas. Finally, RF bands and radio parameters provide operation frequencies and Doppler shift for the MSS system.

Much of the foregoing information may be obtained when the MSS system 10 and the terrestrial wireless system 12 enter into a roaming agreement whereby mobile terminals having one system as their "home" system may operate in the other system as a roaming terminal. Other information, for example, timing and delay information, may require some calibration based upon the coverage area of the terrestrial wireless system relative to the coverage area of the MSS system and the access method for the MSS system. The information can also be dynamically updated by using a satellite receiver at the MSC of the terrestrial wireless system 12. All, however, can be readily obtained and stored at the MSC of the terrestrial wireless system 12 for broadcast into the coverage area 18 thereof For example, the foregoing information may be broadcast on a previously reserved portion of the control channel for the terrestrial wireless system 12.

It is contemplated that the MSC of the terrestrial wireless system 12 should acquire and broadcast the aforementioned switch-over information for each overlying MSS system. By the term "overlying MSS system", it is intended to refer to MSS systems having a coverage area that encompasses the entire coverage area for the terrestrial wireless system. In an alternate embodiment of the invention, it is contemplated that the term "overlying" MSS system further include MSS systems having coverage areas which predominately, or even partially, overlaps, the coverage area for the terrestrial wireless system. Such a configuration is possible since a land cell is relatively small, typically on the order of about 10 km in diameter, while a satellite usually provides coverage over areas in excess of 200 km in diameter. As coverage areas do not have precise boundaries, it is often possible that exchanges can be conducted outside the boundaries of the coverage area. Furthermore, since the coverage area for MSS systems are much larger than that for a land cell, it is very likely that the coverage area for a MSS system would "drag" over the portion of the coverage area for a terrestrial wireless system which does not overlap the coverage area for the MSS system.

The mobile terminal 20 obtains the switch-over information from the MSC of the terrestrial wireless system over an idle hand-up information channel on which the switch-over information is continuously broadcast. Alternately, the idle hand-up information channel may be a separate channel broadcasting at an available frequency or a preallocated portion of the control channel. Whether on a special channel or a preallocated portion of the control channel, the broadcast of the switch-over information is ignored by the mobile terminal 20 until the mobile terminal 20 determines that it is leaving the coverage area. The mobile terminal 20 will then tune to the special channel or preallocated portion of the control channel carrying the switch-over information and acquire it. Alternately, upon determining that it is leaving the coverage area 18, the mobile terminal 20 may issue a request to the MSC of the terrestrial wireless system 12 for the mode switch-over information. In response, the MSC of the terrestrial wireless system 12 would transmits a reply message which contains the mode switch-over information.

Thus, at step 36, the mobile terminal 20 checks the switch-over information to determine if there are any overlying MSS systems, i.e., MSS systems having coverage areas which fully encompass the coverage area of the terrestrial wireless system. Each MSS system for which the terrestrial wireless system broadcasts switch-over information therefor is an overlying MSS system. Conversely, the absence of switch-over information indicates that there are no overlying MSS systems. If a review of the switch-over information indicates that there is at least one overlying MSS system, the method proceeds on to step 38 where the mobile terminal 20 first examines the switch-over information to determine if any of the available MSS systems are compatible with the mobile terminal 20. For example, an available MSS system is incompatible with the mobile terminal if each is configured for a different access method. For example, if the terrestrial wireless system 12 is a TDMA system while the MSS system 10 is a CDMA system, the two are incompatible with each other.

If one or more of the available MSS systems is compatible for use with the mobile terminal 20, the method proceeds to step 40 where the mobile terminal 20 determines if any of the compatible available MSS systems are willing to accept the mobile terminal 20. Generally, the MSS system is only willing to accept mobile terminals for which a roaming or other type of service agreement has been reached. To check if any of the compatible available MSS systems are willing to accept roaming, the mobile terminal checks the satellite system ID for each compatible and available MSS system to the system IDs maintained in the memory subsystem thereof. A match indicates that the MSS system is willing to accept the mobile terminal 20.

Oftentimes, there may be available MSS systems which are compatible for use with the mobile terminal 20 but which are not listed in the system IDs maintained in the memory subsystem of the mobile terminal 20. For example, an available MSS system which is compatible for use with the mobile terminal 20 may not have become operational until after the list of system IDs were stored in the memory subsystem of the mobile terminal 20. Accordingly, if it is determined at step 40 that none of the compatible available MSS systems are willing to accept the mobile terminal, the method proceeds to step 41 where the mobile terminal 20 will attempt to test register with each of the compatible available MSS systems. Upon the first successful registration of the mobile terminal 20 with one of the compatible available MSS systems not contained in the list of system IDs stored in the memory subsystem, the mobile terminal 20 will add the system ID for the MSS system to the bottom of its list of system IDs stored in the memory subsystem and will then proceed to step 42.

The method then proceeds to step 42 where the mobile terminal 20 selects, from the available compatible MSS systems which are willing to accept the mobile terminal 20 or to which the mobile terminal 20 has successfully test registered, a preferred MSS system. If the mobile terminal 20 successfully test registered to an compatible available MSS system, that MSS system is the preferred system. If there is only one available MSS system which is both compatible with and willing to accept the mobile terminal 20, that MSS system will be the preferred system. If, however, there are multiple available MSS systems which are both compatible with and willing to accept the mobile terminal 20, at step 42, the mobile terminal 20 selects a preferred MSS system. As previously set forth, stored in the memory subsystem of the mobile terminal 20 is a list of preferred MSS systems ranked in order of preference. The mobile terminal 20 checks the system ID for each available MSS system compatible with and willing to accept the mobile terminal 20 to the system ID for the most preferred system on the list. If none of the available MSS systems have a system ID which matches the system ID for the preferred system, the system IDs for the available MSS systems are then checked against the system ID for the next preferred system. This continues until a match between one of the available MSS systems and the highest ranked system ID on the list of preferred systems is identified. The matching MSS system is then selected as the preferred MSS system. Continuing on to step 44, the mobile terminal de-registers with the terrestrial wireless system and, at step 46, the mobile terminal 20 registers with the selected MSS system. The method then ends at step 50.

To register with the selected MSS system, the mobile terminal 20 changes its mode of operation to MSS and looks for the appropriate digital control channel with the appropriate timing offset as described in the switch-over information for the selected MSS system. If the mobile terminal 20 has a directional antenna, the satellite orbital location information contained in the switch-over information will improve lock-on and tracking speed, thereby improving the success rate for initial registration with the selected MSS system. Having registered with the selected MSS system, the idle hand-up from the terrestrial wireless system 12 to the selected MSS system is complete. The mobile terminal 20 then awaits further instructions from the selected MSS system.

If, however, it is determined at step 36 that there are no available MSS systems or, if it is determined at step 38, that none of the available MSS systems are compatible with the mobile terminal 20 or, if it is determined at step 40, that none of the compatible available MSS terminals are willing to accept the mobile terminal 20 and it is determined at step 41 that the mobile terminal 20 is unable to test register with any of the compatible available MSS terminals, the method proceeds to step 48 where the mobile terminal 20 would continue to operate in the terrestrial wireless mode until dropped by the terrestrial wireless system, for example, if the mobile terminal 20 loses the signal from the terrestrial wireless system. The method would then end at step 50.

Figure 3A:
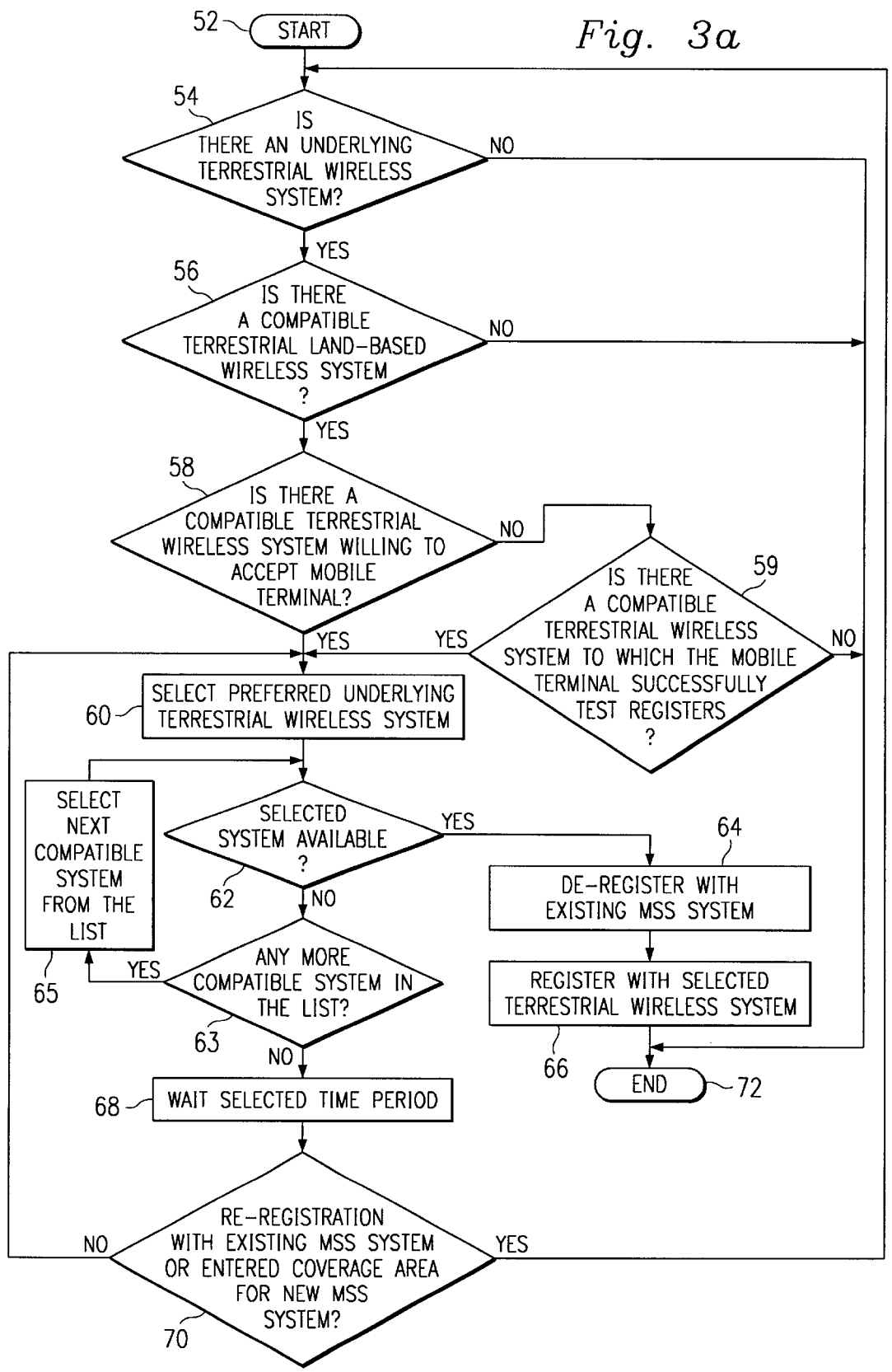
FIG. 3a is a flow chart of a method for switching the dual mode mobile terminal from the MSS mode into the terrestrial wireless mode.
Figure 3B:
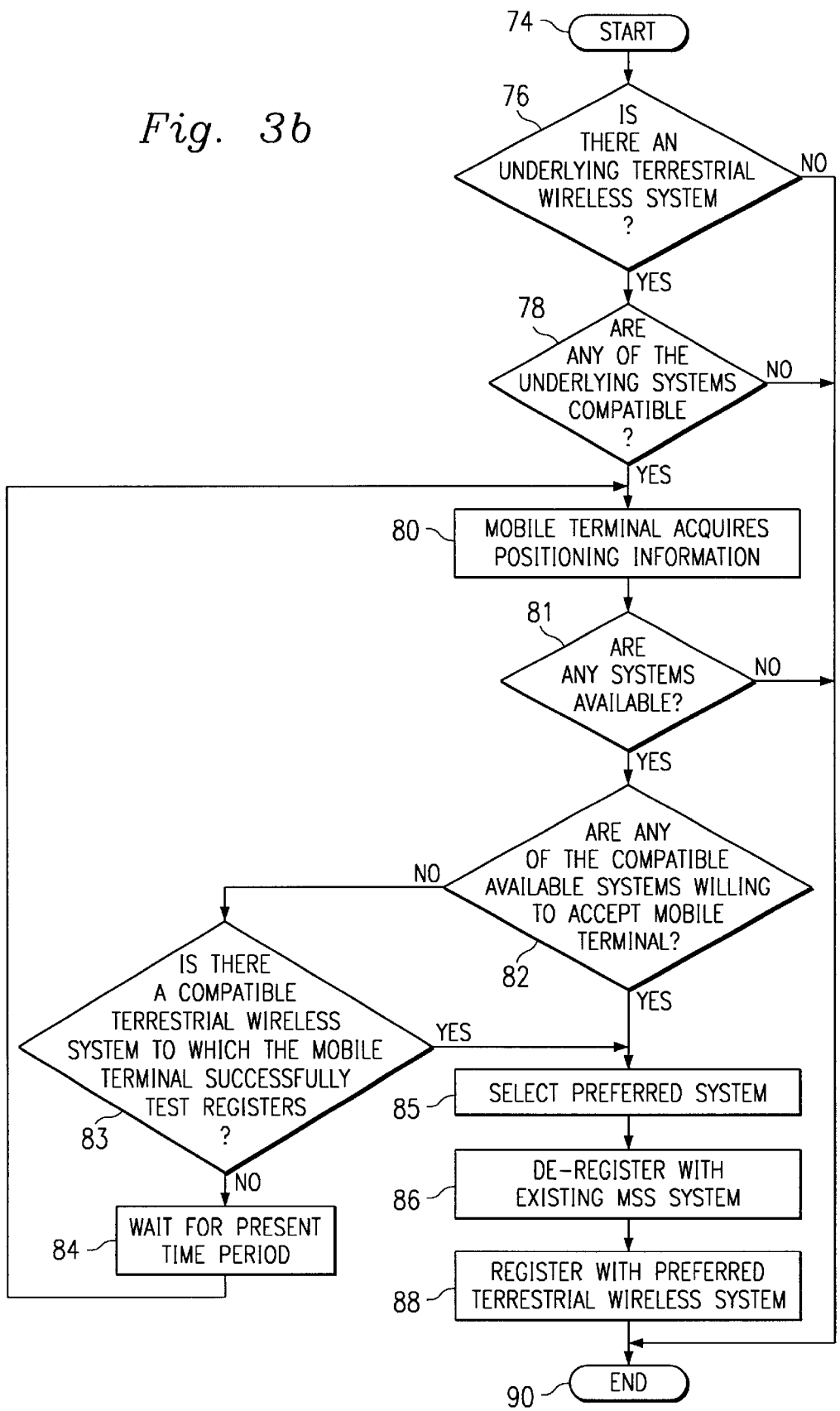
FIG. 3b is a flow chart of an alternate method for switching the dual mode mobile terminal from the MSS mode into the terrestrial wireless mode.
Figure 3C:
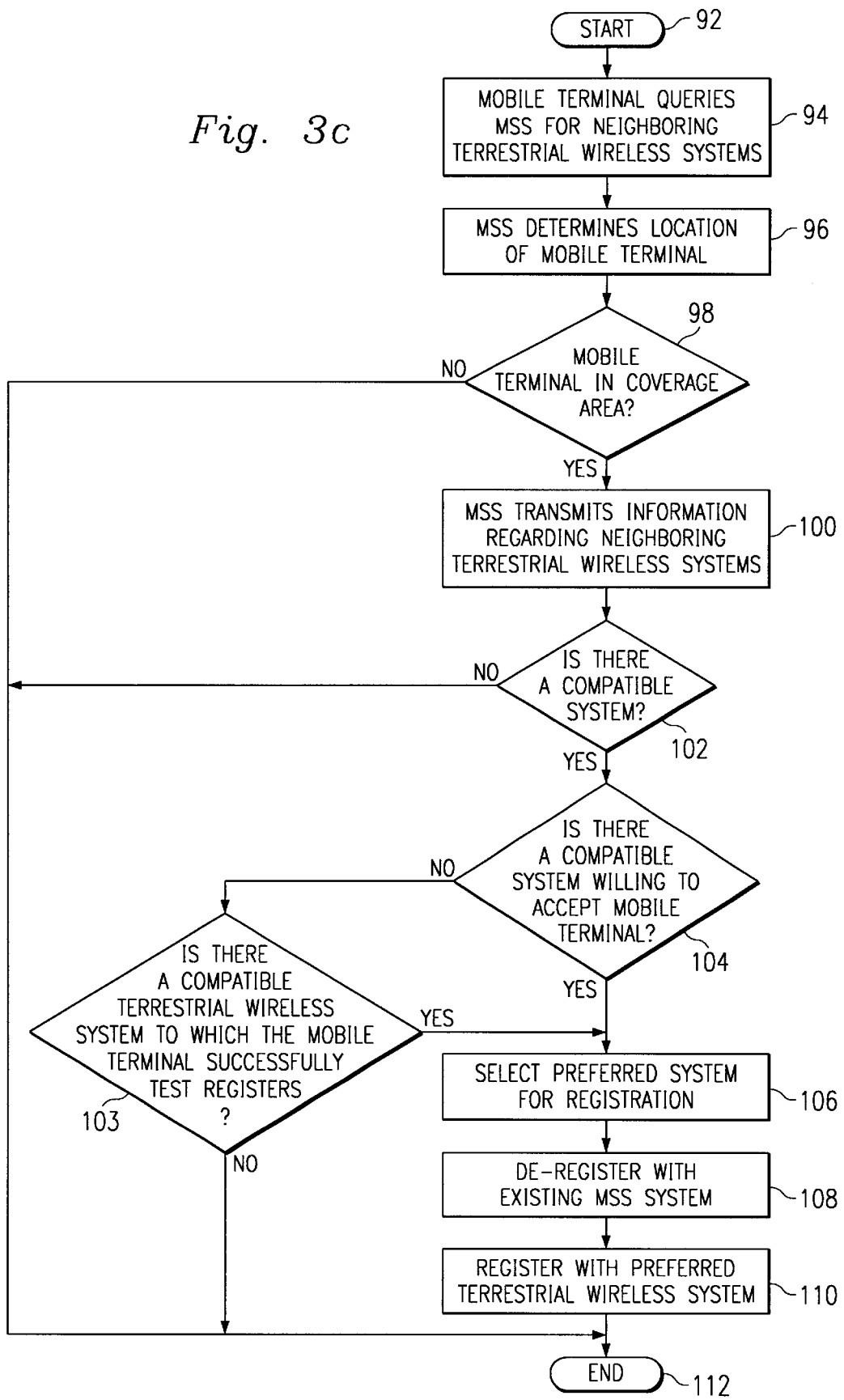
FIG. 3c is a flow chart of another alternate method for switching the dual mode mobile terminal from the MSS mode into the terrestrial wireless mode.

Referring next to FIG. 3a–c, various methods of the mobile terminal automatically switching from the MSS mode where it is registered to a MSS system to a terrestrial wireless mode where it is registered to a terrestrial wireless system shall now be described in greater detail. Broadly speaking, the disclosed methods of an "idle hand-down" of a mobile terminal from a MSS system to a terrestrial wireless system are based upon the premise that terrestrial wireless systems are more economical and are, therefore, preferred for use whenever available. Accordingly, the method of the present invention periodically determines the availability of terrestrial wireless systems and selects a preferred terrestrial wireless system with which to conduct future operations.

The first of these techniques may be seen by reference to FIG. 3a. This method of switching from the MSS mode to a terrestrial wireless mode assumes that no information is available regarding the position of the mobile terminal 20. The method starts at step 52 when the following preconditions are met: the mobile terminal 22 is powered-up, registered with a MSS system 10 and idle. If any of these conditions are not met, for example, the mobile terminal 20 is in use, for example, is engaged in either voice or data communications, the mobile terminal 20 will not switch into the terrestrial wireless mode.

Upon commencement thereof, the method proceeds to step 54 where the mobile terminal 20 checks to see if there are any underlying terrestrial wireless systems by checking an idle hand-down information channel over which switch-over information for underlying terrestrial wireless systems is continuously broadcast. Alternately, the idle hand-down information channel may be a separate channel broadcasting at an available frequency or a preallocated portion of the control channel for the MSS system 10. If the idle hand-down information channel for the MSS system 10 contains switch-over information for one or more terrestrial wireless systems which underlie the coverage area 16 of the MSS system 10, the mobile terminal 20 acquires the information. Like switch-over information for MSS systems, switch-over information regarding existing terrestrial wireless systems which underlie the coverage area for the MSS system 10 is relatively static for existing systems and can be readily collected and maintained by the MSS system 10 for later transfer to the mobile terminal 20. Of course, new service providers or expansions of existing service providers will have to provide switch-over information to the operator of the MSS system 10 Generally, the MSS system 10 will maintain switch-over information on any terrestrial wireless system having a coverage area that overlaps any portion of the coverage area 16 of the MSS system 10. This applies to each of the MSS to terrestrial wireless hand-down techniques described herein since each of these techniques check the availability of terrestrial wireless systems identified in the switch-over information.

The switch-over information which will be maintained by the MSS system 10 for all such underlying terrestrial wireless systems should includes the following: system ID, system type, control channel structure, operating RF bands and, if positional information is maintained therefor, coordinates for the coverage area thereof. The system ID uniquely identifies a terrestrial wireless system. The system type identifies the access method to which the terrestrial wireless system adheres. For example, TDMA, CDMA and GSM represent different access method to which the terrestrial wireless system may adhere. The control channel structure identifies the frequency and channel number for the control channel for the terrestrial wireless system. The operating RF bands identifies the frequencies at which the system transmits radio signals. For example, while PCS systems operate in a frequency band centered at either 900 MHz or 1900 MHz and NA-TDMA systems operate in a frequency band centered at 800 MHz, individual systems operate at a discrete frequency within the frequency band. Thus, by specifying the operating frequency for specific systems, the time spent by the mobile terminal 20 while searching for systems may be greatly reduced.

The MSS system 10 continuously broadcasts the aforementioned information for each underlying terrestrial wireless system using the idle hand-down information channel. It should be noted that the switch-over information broadcast by the MSS system 10 is beam-dependent. Thus, if the MSS system 10 generates plural beams, the switch-over information broadcast over the control channel for each beam may vary, depending on the particular terrestrial wireless systems which underlie each of the beams. When the mobile terminal 20 first registers with the MSS systems 10, it seeks a suitable terrestrial wireless system by examining the idle hand-down information channel for switch-over information and acquiring the switch-over information when located. If the procedure does not result in a switch-over to an underlying terrestrial wireless system, the procedure may repeat whenever the mobile terminal re-registers to the MSS system 10 or enters another beam of the same MSS system.

If there is switch-over information for any underlying terrestrial wireless systems in the idle hand-down information channel for the MSS system 10, the method proceeds to step 56 where the mobile terminal 20 first examines the switch-over information to determine if any of the underlying terrestrial wireless systems are compatible with the mobile terminal 20. For example, an available terrestrial wireless system is incompatible with the mobile terminal if each is configured for a different access method. If one or more of the available terrestrial wireless systems are compatible for use with the mobile terminal 20, the method proceeds to step 58 where the mobile terminals determines if any of the compatible available terrestrial wireless systems are willing to accept the mobile terminal 20. Generally, a terrestrial wireless system is only willing to accept mobile terminals for which a roaming agreement has been reached. To check if any of the compatible available terrestrial wireless systems are willing to accept roaming, the mobile terminal 20 checks the terrestrial wireless system ID for each compatible and available terrestrial wireless system to the system IDs maintained in the memory subsystem thereof. A match indicates that the terrestrial wireless terminal is willing to accept the mobile terminal 20.

As before, oftentimes there be available terrestrial wireless systems which are compatible for use with the mobile terminal 20 but which are not listed in the system IDs maintained in the memory subsystem of the mobile terminal 20. For example, an available terrestrial wireless system which is compatible for use with the mobile terminal 20 may not have become operational until after the list of system IDs were stored in the memory subsystem of the mobile terminal 20. Accordingly, if it is determined at step 40 that none of the compatible terrestrial wireless systems which are willing to accept the mobile terminal 20, the method proceeds to step 59 where the mobile terminal 20 will attempt to test register with each of the compatible available terrestrial wireless systems. Upon the first successful registration of the mobile terminal 20 with one of the compatible available terrestrial wireless systems not contained in the list of system IDs stored in the memory subsystem, the mobile terminal 20 will add the system ID for the terrestrial wireless system to the bottom of its list of system IDs stored in the memory subsystem and will then proceed to step 60.

If, however, it is determined at step 54 that the received information indicates that there are no underlying terrestrial wireless systems or if it is determined at step 56 that none of the underlying terrestrial wireless systems are compatible with the mobile terminal or if it is determined at step 58 that none of the compatible underlying terrestrial wireless systems are willing to accept the mobile terminal 20 and at step 59 that none of the remaining compatible underlying terrestrial wireless systems will accept a test registration from the mobile terminal 20, the method ends at step 72 with the mobile terminal continuing to operate in the MSS mode. Of course, the disclosed method of searching for a suitable terrestrial wireless system to switch to will restart as soon as the mobile terminal 20 periodically re-registers with the existing serving MSS system 10, for example, when the mobile terminal 20 remains idle for a pre-selected time period or enters another beam of the same MSS system 10 or when the mobile terminal 20 registers with a next MSS system, for example, when the mobile terminal 20 leaves the coverage area of the existing MSS system 10 and enters the coverage area of a beam of a next MSS system.

Returning to step 58, upon determining that there are compatible terrestrial wireless systems willing to accept the mobile terminal 20 or that there is a compatible terrestrial wireless system which will allow the mobile terminal 20 to test register therewith, the method then proceeds to step 60 where the mobile terminal 20 selects, from the available compatible terrestrial wireless systems which are willing to accept the mobile terminal 20, a preferred terrestrial wireless system. If there is an available terrestrial wireless system which is both compatible with and willing to accept a test registration from the mobile terminal 20, that terrestrial wireless system will be the preferred system. If there is only one available terrestrial wireless system which is both compatible with and willing to accept the mobile terminal 20, that terrestrial wireless system will be the preferred system. If, however, there are multiple available terrestrial wireless systems which are both compatible with and willing to accept the mobile terminal 20, at step 60, the mobile terminal 20 selects a preferred terrestrial wireless system. As previously set forth, stored in the memory subsystem of the mobile terminal 20 is a list of preferred terrestrial wireless systems ranked in order of preference. The mobile terminal 20 checks the system ID for each available terrestrial wireless system compatible with and willing to accept the mobile terminal 20 to the system ID for the most preferred system on the list. If none of the available terrestrial wireless systems have a system ID which matches the system ID for the preferred system, the system IDs for the available terrestrial wireless systems are then checked against the system ID for the next preferred system. This continues until a match between one of the available terrestrial wireless systems and the highest ranked system ID on the list of preferred systems is identified. The matching terrestrial wireless system is then selected as the preferred terrestrial wireless system.

Proceeding on to step 62, the mobile terminal 20 then determines if the selected terrestrial wireless system is available. Recalling that the coverage area 16 for the MSS system 10 tends to be larger than the coverage area for a terrestrial wireless system, typically, plural terrestrial wireless systems will all underlie the larger MSS system 10. Thus, it is entirely possible that, while the mobile terminal 20 is within the coverage area 16 for the MSS system 10, it is outside the coverage area for the selected terrestrial wireless system. Accordingly, at step 62, the mobile terminal 20 checks to see if it is within the coverage area of the selected terrestrial wireless system. To do so, the mobile terminal 20 looks for the control channel, being broadcast by a terrestrial mobile terminal, which corresponds to the profile received from the MSS system 10. For example, the information received from the MSS system 10 over the idle hand-down control channel indicates the frequency at which the control channel for each terrestrial wireless system broadcasts. If a control channel located at the indicated frequency is received by the mobile terminal 20, the mobile terminal 20 determines that it is within the coverage area of the selected terrestrial wireless system.

If the selected system is available, the method proceeds to step 64 where the mobile terminal 20 optionally de-registers with the MSS system 10, switches its mode of operation from MSS to the mode of operation, in most cases, either cellular or PCS, for the selected terrestrial wireless system and, at step 66, the mobile terminal 20 registers with the selected terrestrial wireless system. To register with the terrestrial wireless system, the mobile terminal 20 again tunes to the control channel for the selected terrestrial wireless system and initiates the registration process with the selected terrestrial wireless system over the control channel. The method then ends at step 72 with the mobile terminal successfully switched into the terrestrial wireless mode, thereby successfully completing the idle hand-down from the MSS system 10 to the selected terrestrial wireless system.

Returning to step 62, if it is determined that the mobile terminal 20 is outside of the coverage area of the selected terrestrial wireless system, the method proceeds to step 63 where the mobile terminal 20 determines if there are additional compatible terrestrial wireless systems willing to accept the mobile terminal 20. If there are, the method proceeds to step 65 where a next compatible terrestrial wireless system willing to accept the mobile terminal 20 is selected, for example, by comparing the system IDs for the remaining terrestrial wireless systems compatible with and willing to accept the mobile terminal 20 to the system IDs for the list of terrestrial wireless systems stored in the memory subsystem of the mobile terminal 20 and ranked in order of preference until a next preferred compatible terrestrial wireless system willing to accept the mobile terminal 20 is identified. The method would then return to step 62 where the mobile terminal 20 determines if the newly selected system is available.

If, however, it is determined at step 63 that there are no other compatible terrestrial land-based wireless systems willing to accept the mobile terminal 20, the method proceeds to step 68 where the mobile terminal 20 awaits the expiration of a selected time period. Upon expiration of the time period, the method returns, via step 70, to step 60 where the mobile terminal 20 re-selects the original preferred terrestrial wireless system and on to step 62 to again check to see if the mobile terminal 20 has entered the coverage area for the preferred terrestrial wireless system. The method will continuously loop in this manner until: (1) the preferred terrestrial wireless system selected at step 60 becomes available; (2) one of the other compatible terrestrial wireless systems willing to accept the mobile terminal 20 and selected at step 65 becomes available; or (3) until one of the conditions listed in step 70 occurs. Specifically, as indicated at step 70, if the mobile terminal 20 detects either a re-registration with the existing MSS system 10, for example, when mobile terminal 20 remains idle for a pre-selected time period or enters a different beam of the same MSS system, or a registration with a new MSS system, for example, when the mobile terminal 20 leaves the coverage area 16 of the prior MSS system 10 and enters the coverage area for a next MSS system before a selected system becomes available, the method returns to step 54 where the search for a suitable terrestrial wireless system continues.

The next of these MSS system to terrestrial wireless system hand-down techniques may be seen by reference to FIG. 3b. This method of switching from the MSS mode to a terrestrial wireless mode differs from that previously described in that the mobile terminal 20 is now configured to determine its position. For example, the mobile terminal 20 may be equipped with a global positioning satellite (or "GPS") receiver which enables the mobile terminal 20 to determine its position from the GPS satellite system. The method commences at step 74, again when the following pre-conditions are met: the mobile terminal 20 is powered-up, registered with a MSS system and idle. If any of these conditions are not met, for example, the mobile terminal 20 is in use, the mobile terminal 20 will stay in the MSS operating mode and will not begin the process of switching into the terrestrial wireless mode.

Upon commencement thereof, the method proceeds to step 76 where the mobile terminal 20 checks to see if there are any underlying terrestrial wireless systems by checking to see if there is switch-over information for any terrestrial wireless systems contained in the control channel for the MSS system. If the control channel for the MSS system 10 contains switch-over information for one or more terrestrial wireless systems which underlie the coverage area of the MSS system 10, the mobile terminal acquires the information. As before, the switch-over information may be both readily obtained and maintained by the MSS system 10 and will include switch-over information for any terrestrial wireless system having a coverage area that overlaps any portion of the coverage area 16 of the MSS system 10. Again as before, the MSS system 10 will maintain the following switch-over information on any terrestrial wireless system having a coverage area that overlaps any portion of the MSS system 10: system ID, network type, control channel structure and RF operating bands. In this embodiment, however, the switch-over information should also include a description of the coverage area of each underlying terrestrial wireless system. For example, positional coordinates which describe the location of the boundary of the coverage area for the underlying terrestrial wireless system may be provided. The MSS system 10 continuously broadcasts the aforementioned information for each underlying terrestrial wireless system using the idle hand-down control channel. As the mobile terminal 20, whenever powered-up and idle, will periodically seek a suitable terrestrial wireless system, the mobile terminal 20 acquires the information from the idle hand-down control channel upon registration with the MSS system 10.

The method then proceeds on to step 78 where the mobile terminal 20 examines the acquired switch-over information to determine if any of the underlying terrestrial wireless systems are compatible with the mobile terminal 20. For example, an underlying terrestrial wireless system is incompatible with the mobile terminal if each is configured for a different access method. If one or more of the terrestrial wireless systems are compatible for use with the mobile terminal 20, the switch-over information for those terrestrial wireless systems is stored in memory for use upon entering the idle state. The method proceeds to step 80 where the mobile terminal 20 determines its own position by requesting positional information from the GPS system associated therewith. The method then proceeds on to step 81 where the mobile terminal 20 determines whether there are any terrestrial wireless systems available. To do so, the mobile terminal 20 compares the positional information which describes the coverage area for each underlying terrestrial wireless systems which was provided to the mobile terminal 20 as part of the switch-over information to the positional information provided by the GPS system to determine if the mobile terminal 20 is positioned within the coverage area of any of the terrestrial wireless systems for which switch-over information has been received. Each terrestrial wireless system for which the mobile terminal 20 is determined to be positioned within the coverage area thereof is then identified at step 81 as being available.

If there are one or more available terrestrial wireless systems, the method continues on to step 82 where the mobile terminal 20 determines if any of the compatible available terrestrial wireless systems are willing to accept the mobile terminal 20. Generally, a terrestrial wireless system is only willing to accept mobile terminals for which a roaming or other service agreement has been reached. To check if any of the compatible available terrestrial wireless systems are willing to accept roaming, the mobile terminal 20 checks the wireless system ID for each compatible available terrestrial wireless system to the system IDs maintained in the memory subsystem thereof. A match indicates that the terrestrial wireless terminal is willing to accept the mobile terminal 20.

Again, there may be available MSS systems which are compatible for use with the mobile terminal 20 but which are not listed in the system IDs maintained in the memory subsystem of the mobile terminal 20. Accordingly, if it is determined at step 82 that none of the compatible available MSS systems are willing to accept the mobile terminal, the method proceeds to step 83 where the mobile terminal 20 will attempt to test register with each of the compatible available MSS systems. Upon the first successful registration of the mobile terminal 20 with one of the compatible available MSS systems not contained in the list of system IDs stored in the memory subsystem, the mobile terminal 20 will add the system ID for the MSS system to the bottom of its list of system IDs stored in the memory subsystem and will then proceed to step 84. If, however, it is determined at step 82 that none of the compatible available underlying terrestrial wireless systems are willing to accept the mobile terminal 20 and it is determined at step 83 that none of the compatible available underlying terrestrial wireless systems will accept a test registration from the mobile terminal 20 at this location, the method proceeds to step 84 where the mobile terminal 20 will wait for a preset time period and then returns to step 80 to issue another positioning request and repeat the checking procedure.

If, however, it is determined at step 76 that there are no underlying terrestrial wireless systems or if it is determined, at step 78, that there are no underlying terrestrial wireless systems which are compatible with the mobile terminal 20, or if it determined at step 81 that none of the compatible underlying terrestrial wireless systems are available, the method ends at step 90 with the mobile terminal determining that it should continue to operate in the MSS mode. Of course, the disclosed method of searching for a suitable terrestrial wireless system restarts as soon as the mobile terminal 20 re-registers with the MSS system 10, for example, when the mobile terminal 20 remains idle for a selected time period or when the mobile terminal 20 registers with a next MSS system, for example, when the mobile terminal 20 leaves the coverage area of the MSS system 10 and enters the coverage area of a next MSS system.

Returning to step 82, upon determining that there is a compatible available terrestrial wireless system willing to accept the mobile terminal 20 or that there is a compatible available terrestrial wireless system which will allow the mobile terminal 20 to test register, the method then proceeds to step 85 where the mobile terminal 20 selects, from the compatible available terrestrial wireless systems which are willing to accept the mobile terminal 20, a preferred terrestrial wireless system. If there is only one compatible available terrestrial wireless system which is willing to accept the mobile terminal 20, that terrestrial wireless system will be the preferred system. If, however, there are multiple compatible available terrestrial wireless systems which are willing to accept the mobile terminal 20, at step 86, the mobile terminal 20 selects a preferred terrestrial wireless system. As previously set forth, stored in the memory subsystem of the mobile terminal 20 is a list of preferred terrestrial wireless systems ranked in order of preference. The mobile terminal 20 checks the system ID for each available terrestrial wireless system compatible with and willing to accept the mobile terminal 20 to the system ID for the most preferred system on the list. If none of the available terrestrial wireless systems. Terrestrial wireless systems have a system ID which matches the system ID for the preferred system, the system IDs for the available terrestrial wireless systems are then checked against the system ID for the next preferred system. This continues until a match between one of the available terrestrial wireless systems and the highest ranked system ID on the list of preferred systems is identified. The matching terrestrial wireless system is then selected as the preferred terrestrial wireless system.

Proceeding on to step 86, the mobile terminal 20 de-registers with the MSS system 10, switches its mode of operation from MSS to the mode of operation, in most cases, either cellular or PCS, for the selected terrestrial wireless system and, at step 88, the mobile terminal 20 registers with the selected terrestrial wireless system. To register with the terrestrial wireless system, the mobile terminal 20 again tunes to the control channel for the selected terrestrial wireless system and initiates the registration process with the selected terrestrial wireless system over the control channel. The method then ends at step 90 with the mobile terminal successfully switched into the terrestrial wireless mode, thereby successfully completing the hand-down from the MSS system 10 to the selected terrestrial wireless system.

The last of these idle hand-down techniques may be seen by reference to FIG. 3c. Like the idle hand-down technique described with respect to FIG. 3b, this technique also determines the position of the mobile terminal 20. Here, however, the MSS system 10 determines the position of the mobile terminal 20. This method of switching from the MSS mode to a terrestrial wireless mode begins at step 92 and, at step 94, the mobile terminal 20 queries the MSS system 10 for information regarding any neighboring terrestrial wireless systems. As used herein, a "neighboring" terrestrial wireless system is a system having a coverage area within which the mobile terminal 20 is located. Queries for neighboring systems may be periodically issued by the mobile terminal 20. For example, the mobile terminal 20 may first query the MSS system 10 a preselected time period after power-up, registration and entry into the idle state. Thereafter, the mobile terminal 20 may query the MSS system 10 each time the idle state is entered and the preselected time period elapses while the mobile terminal 20 remains in the idle state.

Upon receipt of the query, the method proceeds to step 96 where the MSS system 10 determines the location of the mobile terminal 20. Again, determining the position of the querying mobile terminal 20 may be accomplished in a variety of techniques. For example, the MSS system 10 may be equipped with a conventional positional locating system capable of determining the position of the mobile terminal 20 by radio ranging or other means. Alternately, the MSS system 10 may determine the position of the mobile terminal 20 by receiving, from the mobile terminal 20, positional data obtained from an associated GPS device. Continuing on to step 98, the MSS system then determines if there are any neighboring terrestrial wireless systems. Specifically, the MSS system 10 compares the coverage area of the underlying terrestrial wireless systems maintained in the memory subsystem thereof to the known position of the mobile terminal 20 to see if the mobile terminal 20 is positioned within the coverage area of one or more of the underlying terrestrial wireless system. All terrestrial wireless systems having the mobile terminal within the coverage area therefor are classified by the MSS system as neighboring terrestrial wireless systems Proceeding on to step 100, the MSS system 10 retrieves switch-over information for the neighboring terrestrial wireless systems and transmits the switch-over information to the mobile terminal 20. As before, the switch-over information for a system is comprised of the following: system ID, network type, control channel structure and RF operating bands. Preferably, the information is placed in a message transmitted to the mobile terminal 20 over the control channel for the MSS system. While it could be placed within the idle hand-down control channel previously discussed, as the MSS system 10 has tailored the switch-over information for a specific mobile terminal 20, it is preferred that the information is directed only to that particular mobile terminal 20.

Upon receipt of the message by the mobile terminal 20, the method proceeds to step 102 where the mobile terminal 20 examines the switch-over information to determine if any of the neighboring terrestrial wireless systems are compatible with the mobile terminal 20. For example, a neighboring terrestrial wireless system is incompatible with the mobile terminal if each is configured for a different access method. Alternately, the query issued by the mobile terminal 20 in step 94 may include its access method. Later, the MSS system 10 may compare the received access type to the access type for the terrestrial wireless systems classified as neighboring terrestrial wireless systems and, when transmitting switch-over information at step 100, include information only for the neighboring terrestrial wireless systems using that access method. Thus, rather than transmitting switch-over information for all neighboring terrestrial wireless systems and have the mobile terminal 20 determine which of these are compatible, in this alternative technique, the MSS system 10 would instead transmit switch-over information for all compatible neighboring terrestrial wireless systems to the mobile terminal 20, thereby eliminating the need for the mobile terminal 20 to determine, at step 102, which of the neighboring terrestrial wireless systems are compatible with the mobile terminal 20.

If one or more of the neighboring terrestrial wireless systems are compatible for use with the mobile terminal 20, the method proceeds to step 104 where the mobile terminal 20 determines if any of the compatible neighboring terrestrial wireless systems are willing to accept the mobile terminal 20. Generally, a terrestrial wireless system is only willing to accept mobile terminals for which a roaming or other service agreement has been reached. To check if any of the compatible neighboring terrestrial wireless systems are willing to accept roaming, the mobile terminal 20 checks the wireless system ID for each compatible neighboring terrestrial wireless system to the system IDs maintained in the memory subsystem thereof. A match indicates that the terrestrial wireless terminal is willing to accept the mobile terminal 20.

As before, there may be available terrestrial wireless systems which are compatible for use with the mobile terminal 20 but which are not listed in the system IDs maintained in the memory subsystem of the mobile terminal 20. Accordingly, if it is determined at step 82 that none of the compatible neighboring terrestrial wireless systems are willing to accept the mobile terminal 20, the method proceeds to step 103 where the mobile terminal 20 will attempt to test register with each of the compatible neighboring terrestrial wireless systems. Upon the first successful registration of the mobile terminal 20 with one of the neighboring terrestrial wireless systems not contained in the list of system IDs stored in the memory subsystem, the mobile terminal 20 will add the system ID for the MSS system to the bottom of its list of system IDs stored in the memory subsystem and will then proceed to step 84.

If it is determined at step 98 that there are no neighboring terrestrial wireless systems, or if it is determined at step 102 that none of the neighboring terrestrial wireless systems are compatible with the mobile terminal 20, or if it is determined at step 104 that none of the compatible neighboring terrestrial wireless systems are willing to accept the mobile terminal 20 and determined at step 105 that none of the remaining neighboring terrestrial systems will allow the mobile terminal 20 to test register therewith., the method ends at step 112 with the mobile terminal 20 determining that it should continue to operate in the MSS mode within this pre-determined checking period. Of course, the disclosed method of searching for a suitable terrestrial wireless system will restart as soon as the mobile terminal 20 again queries the MSS for underlying terrestrial wireless systems, when the mobile terminal 20 re-registers with the MSS system 10, for example, if the mobile terminal 20 is powered down and then powered up again or when the mobile terminal 20 registers with a next MSS system, for example, when the mobile terminal 20 leaves the coverage area of the MSS system 10 and enters the coverage area of a next MSS system.

Returning to step 104, upon determining that there is a compatible available terrestrial wireless system willing to accept the mobile terminal 20, the method then proceeds to step 106 where the mobile terminal 20 selects, from the compatible available terrestrial wireless systems which are willing to accept the mobile terminal 20, a preferred terrestrial wireless system. If there is only one compatible available terrestrial wireless system which is willing to accept the mobile terminal 20, that terrestrial wireless system will be the preferred system. If, however, there are multiple compatible available terrestrial wireless systems which are willing to accept the mobile terminal 20, at step 86, the mobile terminal 20 selects a preferred terrestrial wireless system. As previously set forth, stored in the memory subsystem of the mobile terminal 20 is a list of preferred terrestrial wireless systems ranked in order of preference. The mobile terminal 20 checks the system ID for each available terrestrial wireless system compatible with and willing to accept the mobile terminal 20 to the system ID for the most preferred system on the list. If none of the available terrestrial wireless systems. Terrestrial wireless systems have a system ID which matches the system ID for the preferred system, the system IDs for the available terrestrial wireless systems are then checked against the system ID for the next preferred system. This continues until a match between one of the available terrestrial wireless systems and the highest ranked system ID on the list of preferred systems is identified. The matching terrestrial wireless system is then selected as the preferred terrestrial wireless system.

Proceeding on to step 108, the mobile terminal 20 de-registers with the MSS system 10, switches its mode of operation from MSS to the mode of operation, in most cases, either cellular or PCS, for the selected terrestrial wireless system and, at step 110, the mobile terminal 20 registers with the selected terrestrial wireless system. To register with the terrestrial wireless system, the mobile terminal 20 again tunes to the control channel for the selected terrestrial wireless system and initiates the registration process with the selected terrestrial wireless system over the control channel. The method then ends at step 112 with the mobile terminal 20 successfully switched into the terrestrial wireless mode, thereby successfully completing the hand-down from the MSS system 10 to the selected terrestrial wireless system. Of course, if the MSS system 10 and the selected terrestrial wireless system are interconnected, the de-registration message can be sent from the selected terrestrial wireless system after the mobile terminal 20 has registered therewith. By doing so, the mobile terminal 20 avoids de-registration with the MSS system 10 until after it has successfully registered with the selected terrestrial wireless system, thereby avoiding a possible loss of service which could occur if the mobile terminal 20 is unable to register with the selected terrestrial wireless system after it de-registers with the MSS system 10.

Although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. For a mobile terminal registered to a mobile satellite system ("MSS") and configured for operation in MSS mode and a terrestrial wireless mode, a method of switching from operating in said MSS mode to operating in said terrestrial wireless mode, comprising the steps of:

creating an idle hand-down channel;

said MSS system broadcasting switch-over information for plural terrestrial wireless systems over said idle hand-down channel, said switch-over information including at least one parameter useful in registering with said wireless terrestrial systems;

said mobile terminal selecting, from said plural terrestrial wireless systems for which switch-over information was broadcast over said idle hand-down channel, a preferred terrestrial wireless system;

said mobile terminal using said broadcast information for said preferred terrestrial wireless system to register with said preferred terrestrial wireless system, wherein prior to registration with said terrestrial wireless system, said mobile terminal is registered with a MSS system and in an idle state;

said mobile terminal de-registering with said terrestrial wireless system; and said mobile terminal switching from said terrestrial wireless mode to said MSS mode.

2. For a mobile terminal configured for operation in a first, mobile satellite system ("MSS") mode and a second, terrestrial wireless, mode, a method of switching from operating in said second mode to operating in said first mode, comprising the steps of:

said mobile terminal selecting a MSS system;

upon selection of said MSS system, said mobile terminal switching from operating in said second mode to operating in said first mode, wherein prior to selection of said MSS system, said mobile terminal is registered with a terrestrial wireless system and in an idle state;

prior to selecting a MSS system, said terrestrial wireless system identifying MSS systems having a coverage area which overlays a coverage area for said terrestrial wireless system, classifying all MSS systems having coverage areas which overlay said coverage area for said terrestrial wireless system as available MSS systems and transmitting, to said mobile terminal switchover information for all of said available MSS systems; and prior to selecting a MSS system, said terrestrial wireless system determining if said mobile terminal is leaving said coverage area for said terrestrial wireless system and advising said mobile terminal that it is leaving said coverage area for said terrestrial wireless system.

3. For a mobile terminal configured for operation in a first, mobile satellite system ("MSS") mode and a second, terrestrial wireless, mode, a method of switching said mobile terminal from conducting operations with a MSS system in said first mode to conducting operations in said second mode, comprising the steps of:

while operating in said first mode, said mobile terminal selecting a terrestrial wireless system for further operations;

upon selection of a terrestrial wireless system for further operations, said mobile terminal switching from conducting operations in said first mode to conducting operations in said second mode if said selected terrestrial wireless system is available;

while operating in said first mode, said mobile terminal periodically checking for terrestrial wireless systems for possible further operations; and prior to said mobile terminal selecting a terrestrial wireless terminal, said MSS system transmitting, for each one of at least one terrestrial wireless system underlying a coverage area for said MSS system, switch-over information for use when switching from conducting operations with said MSS system in said first mode to conducting operations, in said second mode, with a respective one of said at least one terrestrial wireless systems underlying said coverage area for said MSS system.

4. For a mobile terminal configured for operation in a first, mobile satellite system ("MSS") mode and a second, terrestrial wireless, mode, a method of switching said mobile terminal from conducting operations with a MSS system in said first mode to conducting operations in said second mode, comprising the steps of:

while operating in said first mode, said mobile terminal selecting a terrestrial wireless system for further operations;

upon selection of a terrestrial wireless system for further operations, said mobile terminal switching from conducting operations in said first mode to conducting operations in said second mode;

while operating in said first mode, said mobile terminal receiving, from said MSS system, for each one of at least one terrestrial wireless system underlying a coverage area for said MSS system, switch-over information for use when switching from conducting operations with said MSS system in said first mode to conducting operations, in said second mode, with a respective one of said at least one terrestrial wireless systems underlying said coverage area for said MSS system;

said mobile terminal selecting said terrestrial wireless system for further operations from said at least one terrestrial wireless system for which said MSS system transmits switch-over information to said mobile terminal; and said mobile terminal acquiring positional information for said mobile terminal.

5. For a mobile terminal configured for operation in a first, mobile satellite system ("MSS") mode and a second, terrestrial wireless, mode, a method of switching said mobile terminal from conducting operations with a MSS system in said first mode to conducting operations in said second mode, comprising the steps of:

while operating in said first mode, said mobile terminal selecting a terrestrial wireless system for further operations;

upon selection of a terrestrial wireless system for further operations, said mobile terminal switching from conducting operations in said first mode to conducting operations in said second mode;

said MSS system acquiring positional information for said mobile terminal;

said MSS system determining if said mobile terminal is positioned within a coverage area of each one of at least one terrestrial wireless system underlying a coverage area for said MSS system;

said mobile terminal receiving from said MSS system, for each one of said at least one terrestrial wireless system underlying said coverage area for said MSS system and having a coverage area within which said mobile terminal is positioned, switch-over information for use when switching from conducting operations with said MSS system in said first mode to conducting operations, in said second mode, with a respective one of said at least one terrestrial wireless systems underlying said coverage area for said MSS system;

said mobile terminal selecting said terrestrial wireless system for further operations from said at least one terrestrial wireless system for which said MSS system transmits switch-over information to said mobile terminal;

said mobile terminal determining if any of said at least one terrestrial wireless system for which said MSS system transmits switch-over information are compatible with said mobile terminal;

said mobile terminal determining if any of said at least one terrestrial wireless system for which said MSS system transmits switch-over information and determined to be compatible with said mobile terminal will accept said mobile terminal; and selecting, from said at least one terrestrial wireless system for which said MSS system transmits switch-over information, determined to be compatible with said mobile terminal and which will accept said mobile terminal, a preferred terrestrial wireless system as said selected terrestrial wireless system for continued operations.

6. The method of claim 2 and further comprising the step of:

said mobile terminal selecting one of said available MSS systems as said selected MSS system.

7. The method of claim 6 wherein the step of selecting one of said available MSS systems further comprises the steps of:

determining if any of said available MSS systems are compatible with said mobile terminal;

determining if any of said compatible and available MSS systems will accept said mobile terminal;

selecting, from said compatible and available MSS systems willing to accept said mobile terminal, a preferred MSS system as said selected MSS system.

8. The method of claim 7 and further comprising the step of:

continuing to operate said mobile terminal in said second mode if:
(1) there are no available MSS systems;
(2) none of said available MSS systems are compatible with said mobile terminal; or
(3) none of said compatible available MSS terminals are willing to accept said mobile terminal.

9. The method of claim 3 wherein the step of selecting said terrestrial wireless system for further operations further comprises the step of said mobile terminal selecting said terrestrial wireless system for further operations from said at least one terrestrial wireless system for which said MSS system transmits switch-over information to said mobile terminal.

10. The method of claim 9 wherein the step of selecting said terrestrial wireless system for continued operations from said at least one terrestrial wireless system for which said MSS system transmits switch-over information to said mobile terminal further comprises the steps of:

said mobile terminal determining if any of said at least one terrestrial wireless system for which said MSS system transmits switch-over information is compatible with said mobile terminal;

said mobile terminal determining if any of said at least one terrestrial wireless system for which said MSS system transmits switch-over information and determined to be compatible with said mobile terminal will accept said mobile terminal; and selecting, from said at least one terrestrial wireless system for which said MSS system transmits switch-over information, determined to be compatible with said mobile terminal and which will accept said mobile terminal, a preferred terrestrial wireless system as said selected terrestrial wireless system for continued operations.

11. The method according to claim 10 and further comprising the steps of:

said mobile terminal periodically determining if said selected terrestrial wireless system is available; and said mobile terminal registering with said selected terrestrial wireless system upon determining that said selected terrestrial wireless system is available.

12. The method of claim 11 and further comprising the step of:
   continuing to operate said mobile terminal in said first mode if:
   (1) there are no terrestrial wireless system which underlie said MSS system;
   (2) none of said terrestrial wireless systems which underlie said MSS system are compatible with said mobile terminal;
   (3) none of said compatible available terrestrial wireless systems which underlie said MSS system are willing to accept said mobile terminal; or
   (4) none of said compatible available terrestrial wireless systems which underlie said MSS system which are willing to accept said mobile terminal are available.

13. The method of claim 4 wherein the step of selecting said terrestrial wireless system for continued operations from said at least one terrestrial wireless system for which said MSS system transmits switch-over information to said mobile terminal further comprises the steps of:
   said mobile terminal determining if any of said at least one terrestrial wireless systems for which said MSS transmits switch-over information is available;
   said mobile terminal determining if any of said at least one terrestrial wireless system for which said MSS system transmits switch-over information and determined to be available are compatible with said mobile terminal;
   said mobile terminal determining if any of said at least one terrestrial wireless system for which said MSS system transmits switch-over information and determined to be available and compatible with said mobile terminal will accept said mobile terminal; and
   selecting, from said at least one terrestrial wireless system for which said MSS system transmits switch-over information, determined to be available, compatible with said mobile terminal and which will accept said mobile terminal, a preferred terrestrial wireless system as said selected terrestrial wireless system for continued operations.

14. The method according to claim 13 wherein the step of said mobile terminal determining if any of said at least one terrestrial wireless systems for which said MSS transmits switch-over information is available further comprises the steps of:
   said mobile terminal determining, for each of said at least one terrestrial wireless systems for which said MSS transmits switch-over information, if said mobile terminal is located within a corresponding coverage area thereof;
   if said mobile terminal is located within said coverage area, said mobile terminal determining that said corresponding terrestrial wireless system is available.

15. The method of claim 14 and further comprising the step of:
   continuing to operate said mobile terminal in said first mode if:
   (1) there are no available terrestrial wireless systems
   (2) none of said available terrestrial wireless systems are compatible with said mobile terminal; or
   (3) none of said compatible available terrestrial wireless systems are willing to accept said mobile terminal.

16. The method of claim 5 and further comprising the step of:
   continuing to operate said mobile terminal in said first mode if:
   (1) there are no terrestrial wireless systems having coverage areas within which said mobile terminal is positioned
   (2) none of said terrestrial wireless systems having coverage areas within which said mobile terminal is positioned are compatible with said mobile terminal; or
   (3) none of said compatible terrestrial wireless systems having coverage areas within which said mobile terminal is positioned are willing to accept said mobile terminal.

* * * * *